United States Patent [19]

Trattner et al.

[11] 3,976,853

[45] Aug. 24, 1976

[54] NON-FUSIBLE ELECTRODE, IN PARTICULAR FOR TUNGSTEN INERT GAS WELDING AND A PROCESS FOR THE PRODUCTION THEREOF

[75] Inventors: Hermann Trattner; Hans Raab, both of Munich, Germany

[73] Assignee: Siemens Aktiengesellschaft, Berlin and Munich, Germany

[22] Filed: June 17, 1974

[21] Appl. No.: 479,846

[30] Foreign Application Priority Data
June 20, 1973 Germany.................. 2331558

[52] U.S. Cl. ............... 219/145; 29/182.3; 219/75; 219/149; 313/346 R
[51] Int. Cl.² ................................ B23K 35/04
[58] Field of Search ......... 219/75, 145, 137, 149; 29/182.3; 313/337, 346 R

[56] References Cited
UNITED STATES PATENTS

| | | |
|---|---|---|
| 3,086,103 | 4/1963 | Hackman et al............. 219/145 X |
| 3,141,953 | 7/1964 | Browning....................... 219/145 |
| 3,378,622 | 4/1968 | Marin............................ 219/145 X |
| 3,421,972 | 1/1969 | Cromwell et al. .............. 29/182.3 |
| 3,534,455 | 10/1970 | Bondley..................... 313/346 R X |
| 3,546,422 | 12/1970 | Bykhovsky et al............ 219/75 X |
| 3,597,649 | 8/1971 | Bykhovsky et al............ 219/145 X |
| 3,639,161 | 2/1972 | Trattner et al................. 219/145 X |
| 3,676,639 | 7/1972 | Esiban et al. ................. 219/75 X |

Primary Examiner—J. V. Truhe
Assistant Examiner—N. D. Herkamp
Attorney, Agent, or Firm—Hill, Gross, Simpson, Van Santen, Steadman, Chiara & Simpson

[57] ABSTRACT

An electrode, particularly for use in tungsten inert gas welding, and a method for the production thereof wherein the electrode consists of a thoriated tungsten electrode rod having a bore in the working end thereof with an internal surface roughness formed by electro-errosion, the bore being filled with a mass of an electron emission increasing metal-nonmetal compound which is fuse-sintered in place to form a centrally disposed plug in the working end of the electrode.

3 Claims, 2 Drawing Figures

NON-FUSIBLE ELECTRODE, IN PARTICULAR FOR TUNGSTEN INERT GAS WELDING AND A PROCESS FOR THE PRODUCTION THEREOF

BACKGROUND OF THE INVENTION

1. Field of the Invention

This invention relates to electrodes for electric arc welding and in particular to a non-fusible electrode having a working tip which has an in situ formed plug centrally disposed in the end face thereof.

2. The Prior Art

Tungsten electrodes are well known and have mainly been used for TIG(tungsten inert gas) arc welding in a gas shield atmosphere utilizing a non-fusible electrode. In order to increase the emission force of the electrode while maintaining a stable arc, it has been known to manufacture such electrodes from a mixture of powdered tungsten and a metal oxide by methods such as sintering. Electrodes of this type may contain up to approximately 2% thorium dioxide and may be referred to as thoriated tungsten electrodes. If the thorium dioxide additive is increased above the 2% level, the emission force of the electrode slowly increases but at the same time the brittleness of the resultant electrode also increases considerably. Apart from the use of thorium dioxide, additives of zirconium, rhenium and other high melting point metals and their oxides are also known. However, of the aforementioned additions, thorium dioxide is preferably used inasmuch as it withstands high temperatures and possesses a low tendency to evaporate.

Although such prior art electrodes have desirable characteristics, it has been proven that they do not operate satisfactorily for automatic microfusion welding, that is for the welding of thin metal sheets having a thickness of at least 1 mm. In microfusion welding the welding current strength is less than 12 amperes. Additionally, ignition must take place safely, i.e. in a reliably contactfree fashion in a helium shielded atmosphere over a long period of time. However, a series of experiments has proven that even thoriated tungsten electrodes do not exhibit a precise ignitability and, on the average, they have substantially lost their ignitability after approximately 60 ignitions. More precise observations have shown that, at the beginning of the experiment, the ignition takes place from the tip of the electrode outwards, and that within increasing number of ignitions, a consistently increasing area of the surface of the electrode participates in the ignition. After an average of 60 ignitions (calculated from a widely dispersed range), an "arc-back" takes place from the outer surface of the electrode to the burner sleeve of the welding burner. This eventually results in failure and, after further ignition experiments, ignition could no longer be achieved. Although in using thoriated tungsten electrodes, the ignitability may be re-established by regrinding the electrode tip, the drastic decrease in the varying behavior of the ignitability in dependence upon the number of ignitions makes it difficult to use tungsten shield gas welding and plasma processes in mechanized production.

It has been proposed (See German Pat. No. 1,806,856) to improve the ignition reliability of such electrodes by applying a coating layer in the vicinity of the electrode tip, which layer consists of a metal-nonmetal compound having a relatively high melting point such as, for example, metal oxides, metal carbides or metal nitrides, or mixtures of several such substances. With an electrode of this kind, a stable arc may be ignited in an exact sequence, with the electrode exhibiting a relatively high stability. The stability achieved results from the application of a mass composed of powdered thorium dioxide with a binding agent, to the electrode tip. Thereafter the electrode is heated until the thorium dioxide melts. An arc is then ignited at a low current strength. The electrode distance is thereafter enlarged and the current strength further increased, in fact to beyond the normal operative range of the electrode. Thus, the thorium dioxide is fuse-sintered on the end of the electrode. With an electrode of this type, produced by the known process, ignition takes place uniformly from the tip of the electrode outwards.

However, it has been observed, that over a long period of burning of an electrode of this type, an "arc-back" will take place from the shaft of the electrode to the burner in the area adjacent the electrode tip which has been provided with the coating layer. This is due to the fact that the mass which has been applied to the electrode tip by fuse-sintering, encourages the arc to burn from the outer peripheral surface of the electrode, so that following a drop in the emissive capacity of the coating mass, "arc-back" occurs.

SUMMARY OF THE INVENTION

The object of this invention is to improve upon the prior art electrodes in such a manner that even over a long period of burning, the electrode will exhibit a quietly burning arc which commences only from the electrode tip. This object is obtained in that:

a. A mass which encourages the electron emission is embedded in a bore in the tip of the electrode in the manner of a plug, and b. The surface roughness of the wall of the bore which receives the mass in the tip of the electrode amounts to at least 10 $\mu$m, and c. The mass is fuse-sintered in situ in the bore.

An electrode produced according to this process featuring these properties will have a high arc stability over a comparatively substantially long burning period even after frequent ignition. That is even after a long period of burning, the arc still burns and remains uniformly from the tip of the electrode. Although a drop in the emission cannot be avoided in the long term, no "arc-back" will occur from the shaft of the electrode even after operation for a relatively long period of time. In addition, there will be no impairment of the good burning characteristics of the electrode until complete breakdown of the electrode.

Because the introduction of the bore into the electrode tip is difficult, a special process has been created. Electrodes composed of tungsten are manufactured by sintering and they are very hard and brittle which means that they are difficult to process with mechanically operated tools such as normal machine tools.

In order to produce a non-fusible electrode consisting of tungsten or thoriated tungsten for tungsten inert gas welding or plasma welding, which has a tip bearing a mass composed of a mixture of a metal-nonmetal compound to increase the electron emission the electrode tip is first hollowed out to provide a bore, the bore is then filled with the mass which will encourage the electron emission, the mass is then fuse-sintered in the electrode tip in situ.

In order to form the bore with the desired surface roughness of the bore wall, the tip of the electrode is preferably hollowed out by means of spark errosion. If the walls of the bore are not sufficiently rough, the mass will not adhere sufficiently to the walls both during the plugging process and during the later fixing process by sintering. Insufficient adherence during either or both of these processes can result in the mass becoming detached from the bore walls should the electrode suffer an unintentional blow or impact, such as can easily occur during manual welding for example. In such an event, the mass can sail out of the bore during operation.

The depth of the bore which is introduced to the tip of the electrode and which serves to receive the mass which encourages the electron emission, preferably corresponds to the diameter of the electrode. If the bore is too deep, when the bore is plugged with a mass, porous spots can arise; however, if the bore is not sufficiently deep, the mass will not adhere to the walls of the bore sufficiently.

It is therefore a general object of this invention to provide an improved electrode.

More particularly, it is an object of this invention to provide an improved tungsten or thoriated tungsten electrode having a plug-filled bore in the working end thereof.

It is a more particular object of this invention to provide a tungsten or thoriated tungsten electrode having a bore formed in the end thereof with a mass of a mixture of a metal-non-metal received therein which mass controls the electon emission from the electrode and aids in centering the emission from the tip of the electrode.

It is a more specific object of this invention to provide a tungsten or thoriated tungsten electrode having a bore in the working end thereof, the bore being filled with a mass of a metal-non-metal compound fuse-sintered in place in the bore.

It is a specific object of this invention to provide a method of making an electrode which comprises the steps of forming a bore in the working end of the electrode by means of spark errosion, the bore having a surface roughness of at least 10 $\mu$m filling the bore with a mixture of a metal-non-metal compound, fuse-sintering the compound in place in the bore and adhering the compound to the walls of the bore.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of novel concepts of the disclosure and in which.

DESCRIPTION OF THE PREFERRED EMBODIMENTS

Figure 1:
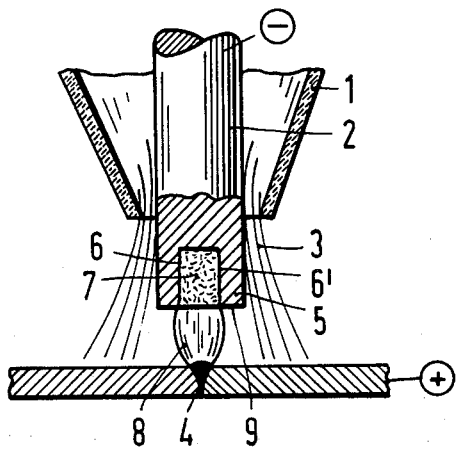
FIG. 1 schematically illustrates an electron welding assembly for tungsten inert gas welding having an electron according to this invention.

FIG. 1 illustrates only the nozzle 1 end of a tungsten inert gas (TIG) welding burner having a non-fusible electrode 2 consisting of thoriated tungsten. During operation of the burner, the electrode and the welding spot 4 are flushed with shield gas 3 eminating from the nozzle 1. The electrode, which is shown in scale approximately 10 to 1, is provided on its working end 5 with a cavity 6 in which is embedded a mass 7 which serves to encourage the electron emission. The mass is in the form of a plug. The mass 7 is preferably of a metal-non-metal mixture which may be chosen from the previously mentioned substances.

When the electrode is in operation, the arc 8 ignites reliably and always centrally from the tip, i.e. from the center of the surface 9 of the end of the welding electrode 2.

Figure 2:
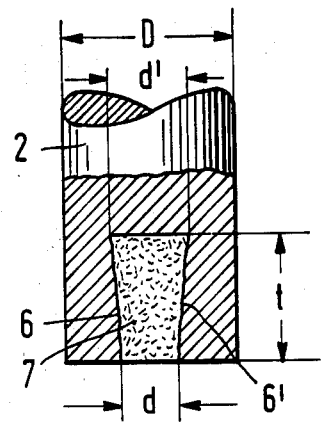
FIG. 2 is an enlarged view of the working end of the electrode of FIG. 1.

The electrode tip, with the embedded mass is formed according to the following process, making reference to FIG. 2. Cavity 6 is introduced into the very hard electrode body 2, preferably by electro-errosion. As a result of the electro-errosion, a sufficient surface roughness of the walls 6' of the cavity 6 are produced. This roughness should be at least 10 $\mu$m. The cavity depth $t$ from the surface 9N preferably corresponds to the diameter D of the electrode. The inside diameter $d$ of the cavity is likewise dependent upon the diameter D of the electrode, but in electrodes having diameters of more than 2 mm. this is not critical. In the case of small electrodes, it is preferred to select the diameter $d$ to be no greater than 0.5 D. If, in small electrodes, the bore diameter $d$ is too great, there is a danger that during the plugging of the bore with the electron emission promoting mass or later during welding operation, the walls of the electrode radially outwardly from the bore will be too thin and will break. In addition, it is advantageous to design the cavity 6 to be undercut as illustrated in such a way that the mass 7 which promotes the electron emission is held in the electron tip in the manner of a lead seal. The undercut angled walls of the cavity in the electron tip are best created by lowering an erroding copper wire into the end of the electrode 2 and thereafter moving either the wire or the electrode in such a way that the base diameter $d'$ is greater than the end diameter $d$ of the cavity. After errosion, the cavity is plugged with the aforementioned mass. Thereafter the electrode tip is heated, preferably by resistance heating. After heating, an arc is ignited and the powdery mixture is fuse-sintered in the electrode tip in a shield gas atmosphere by a method which, after ignition of the arc, enlarges the electrode distance from the oppositely charged work piece while drastically increasing the current strength to a point beyond the normal operating range of the electrode. This method effectively fuse-sinters the mass in situ in the bore 6 of the electrode tip.

Although the teachings of our invention have herein been discussed with reference to specific theories and embodiments, it is to be understood that these are by way of illustration only and that others may wish to utilize our invention in different designs or applications.

We claim as our invention:

1. An electrode for microfusion tungsten inert gas welding comprising, a solid non-fusible tungsten rod having a working tip end from which an arc is struck, said end having a central recess of a depth substantially equal to the rod diameter and a diameter at the working tip not greater than about half the diameter of the rod, said recess having rough surface walls of the order of 10 $\mu$m, said recess being filled with powdered high melting electron emission material sintered in situ in the recess and forming a plug interlocked with the rough recess walls.

2. The electrode of claim 1 wherein the high melting electron emission material is powdered thorium dioxide.

3. The electrode of claim 1 wherein said recess increases in diameter to the bottom of the recess.

* * * * *